TRANSFLUXOR CIRCUIT ARRANGEMENT

Filed Nov. 13, 1962

3 Sheets-Sheet 1

April 11, 1967 M. BIER ETAL 3,314,053

TRANSFLUXOR CIRCUIT ARRANGEMENT

Filed Nov. 13, 1962 3 Sheets-Sheet 3

1

3,314,053

TRANSFLUXOR CIRCUIT ARRANGEMENT

Martin Bier and Georg Glünder, Munich, Germany, assignors to Siemens & Halske Aktiengesellschaft Berlin and Munich, a corporation of Germany Filed Nov. 13, 1962, Ser. No. 237,401

Claims priority, application Germany, Nov. 14, 1961, S 76,674; Oct. 17, 1962, S 82,068

26 Claims. (Cl. 340—174)

The invention disclosed herein relates to a transfluxor circuit arrangement and is particularly concerned with a circuit arrangement of this character having improved operating properties which extend the practical application thereof.

Transfluxors have attained great importance in connection with magnetic control and storage devices. Among the many uses to which a transfluxor may be put may be mentioned, for example, its use as a magnetic storage element in connection with computers or as an analog digital converter in regulation circuits.

Magnetizable material with a hysteresis loop which is to a large extent rectangular, is used as a core material for the transfluxor. The transfluxor has at least two apertures and three or more legs for flux, thus forming at least two coupled magnetic circuits. Moreover, a transfluxor comprises generally four windings, namely, first, a socalled blocking winding for placing the core into a definite magnetic remanence condition, second, a control- or setting winding for storing desired data or for controlling other operations, for example, regulation operations, third, a socalled input winding (also referred to as drive or readout winding), and fourth, an output winding from which can be obtained, for example, the stored data. In the event that the transfluxor is used, for example, as an amplifying element, there is obtained at the output winding the output value in the form of the amplifier voltage or current.

The various objects and features of the invention will appear from the description which is rendered below with reference to the accompanying drawings, wherein—

FIG. 1 shows a known two-aperture transfluxor;

FIG. 2 indicates as an example three characteristic curves of the transfluxor shown in FIG. 1;

Figure 5:
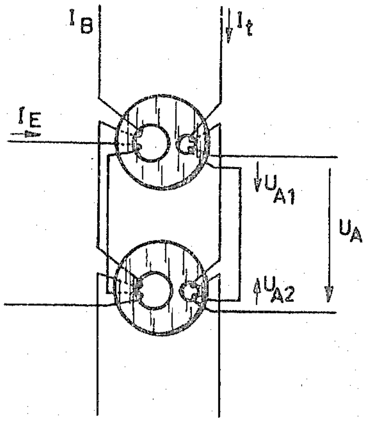
FIG. 5 illustrates another example of a two-aperture transfluxor arrangement contemplated by the invention.
Figure 6:
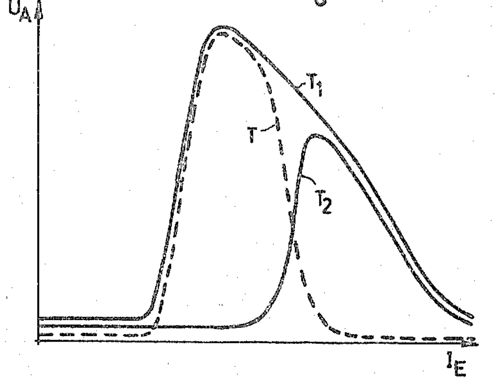
Figure 7:
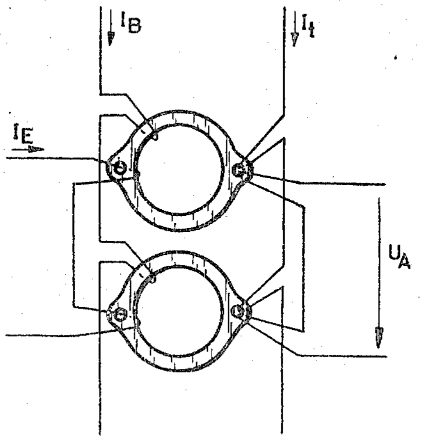
Figure 8:
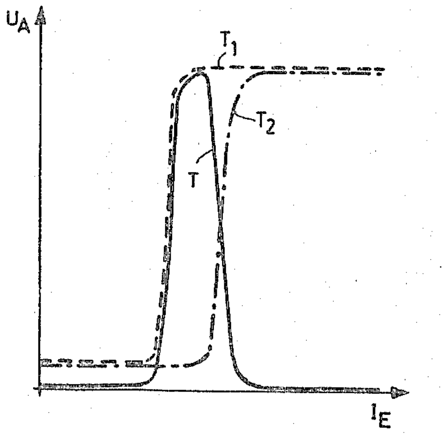
Figure 9:
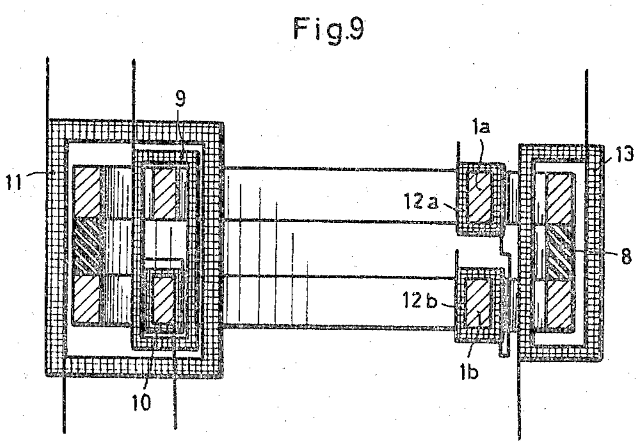
Figure 10:
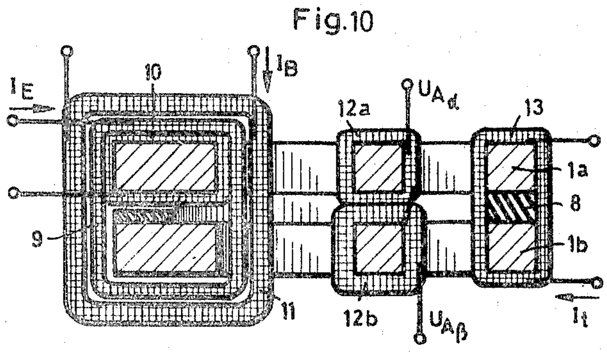
Figure 11:
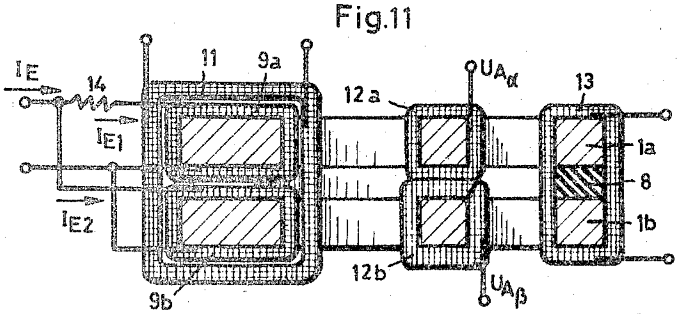

FIG. 6 indicates characteristic curves obtained with the arrangement shown in FIG. 5;

FIG. 7 represents an example of a three-aperture transfluxor arrangement according to the invention;

FIG. 8 shows the characteristic curves obtained with the arrangement indicated in FIG. 8;

FIG. 9 illustrates in schematic manner an example of a transfluxor arrangement employing according to the invention two three-aperture transfluxors with smiplified windings;

FIG. 10 illustrates an arrangement according to the invention employing two two-aperture transfluxors;

FIG. 11 represents another embodiment according to the invention; and

Figure 12:
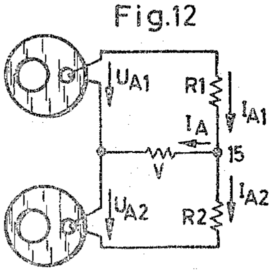
Figure 13:
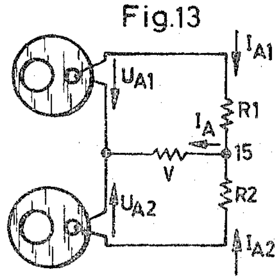

FIGS. 12 and 13 shows circuit examples.

The operation of a transfluxor will now be explained

Figure 1:
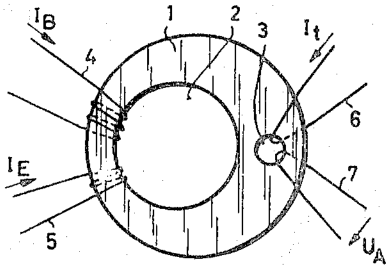

2 with reference to a known two-aperture transfluxor, an example of which is shown in FIG. 1.

The transfluxor shown in FIG. 1 comprises a magnetizable core 1 which is subdivided by two apertures 2 and 3 to form three flux legs. The blocking current $I_B$ flows through the blocking winding 4, the setting current $I_E$ flows through the setting winding 5, the drive current $I_t$ flows through the drive winding 6, and the output voltage $U_A$ is obtained from the output winding 7.

If the magnetic field $H_E$ effected in the transfluxor by the setting flow $I_E.w_E$ (product of the setting current $I_E$ and the number of turns $w_E$ of the setting winding) is smaller than the coercive field strength $H_c$ of the transfluxor, the transfluxor used as a carrier of informations remains in a blocking state for the setting current $I_E$ by the blocking flow $I_B.w_B$. The setting current $I_E$ corresponds with the measuring value. The blocking flow $I_B.w_B$ is the product of the blocking current $I_B$ and the number of turns of the blocking winding $w_B$. The transfluxor is opened when the magnetic field $H_E$ respectively reaches or exceeds this border value $H_c$ at the inner rim of the aperture through which is extended the setting winding. The part of the transfluxor core cross section which is permeated by this magnetic field thereby begins to change its magnetization. An optimum operation for the digital use results, for example, just when a flux leg is fully magnetized by the setting excitement $I_E.w_E$ in the setting direction and when the other leg is still saturated in blocking direction, it being assumed that both legs have the same cross section. Upon further increase of the setting current, resulting in the setting field $H_E$ respectively reaching or exceeding the coercive field strength $H_c$ over the entire transfluxor core, the transfluxor will again be blocked.

Accordingly, there have to be considered three regions of the characteristic output curve $U_A=f\ (I_E.w_E)$ of a transfluxor, namely, two blocking regions and the opening region. In the case of two-aperture transfluxors, the opening region is subdivided into the setting region, which is the rising branch of the characteristic curve and the over-setting region, which is the falling branch. The output voltage of the transfluxor is designated by $U_A$.

Figure 2:
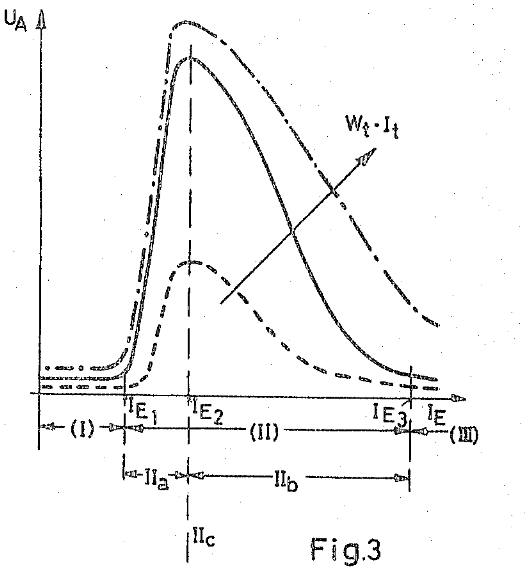

FIG. 2 shows by way of example three characteristic curves of the transfluxor illustrated in FIG. 1. The region (I), up to the setting current $I_{E1}$ characterizes the blocking condition of the transfluxor. The region (II), up to the setting current $I_{E3}$ characterizes the region in open condition of the transfluxor, and the region (III) beyond the setting current $I_{E3}$ characterizes the blocking condition above the over-setting. The opening region (II) embraces the region II*a* of the partial setting and the region II*b* of the over-setting. The characteristic curve begins to fall at the point of the optimum setting II*c*. The driver flows $I_t.w_t$ are given as parameter for the function $U_A=f(I_E.w_E)$.

For further explanations of the operation of a transfluxor, reference is made to the paper of J. A. Rajchman and A. W. Lo, published in Proceedings of the I.R.E., vol. 44, March 1956, pages 321–332.

It is found that the falling region of the characteristic curves, that is, the over-setting region, has in the case of two-aperture transfluxors a slighter inclination than the characteristic curve in the rising branch, that is, in the setting region. Elements are required for various applications which have a characteristic rising as well as a falling curve which is as steep as possible. It is moreover in some cases desirable to impart to the characteristic curve a different form, for example, a step-like form.

The object of the invention is to provide a circuit arrangement with transfluxor elements which exhibits a steeply rising and above a culmination region likewise a course of the characteristic curve which is as steeply falling as possible. Moreover, the kind of characteristic curve and the width of the culmination region shall be so as to permit alteration and matching thereof to the intended use.

The invention contemplates a circuit arrangement having at least two transfluxors, the output windings of which are electrically connected, wherein the characteristic curves of the transfluxor output values are shifted so that the setting range of one transfluxor begins above the end of the setting range of at least one other transfluxor, and wherein the output windings are connected with one another so as to effect a superposition of the transfluxor output values.

The output values, that is, the output voltage or, upon loading the output current, of the individual transfluxors are according to the invention combined with the output values of the entire arrangement. A superposition may thereby be effected by summation, for example, of the output voltages with respect to the resultant output voltage of the entire arrangement. The output windings are in such case serially connected in identical sense of winding.

Figure 4:
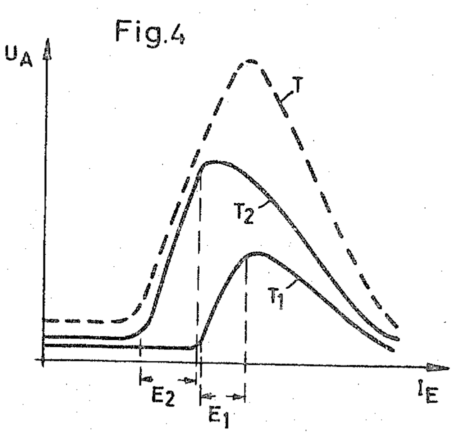
FIG. 4 shows the course of characteristic curves obtained with an arrangement according to FIG. 3.
Figure 3:
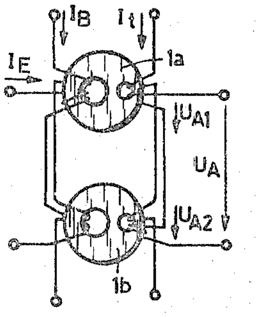
FIG. 3 represents an example of a two-aperture transfluxor arrangement according to the invention.

FIG. 3 shows an example of such a transfluxor arrangement according to the invention, comprising two two-aperture transfluxors. There are provided similar cores 1*a*, 1*b* having similar blocking and drive windings, one of the cores (1*a*) having, however, a greater number of setting turns than the other core (1*b*). The corresponding windings of both cores are respectively magnetized by the same blocking- and setting- or driver current. The output windings are wound in the same sense with respect to one another and serially connected, so that the output voltage $U_A$ is composed of the two output voltages $U_{A1}$ and $U_{A2}$ of the individual transfluxors. The circuiting of the output windings wound in the same sense with respect to one another effects a resultant characteristic curve course $U_A=U_{A1}+U_{A2}$. The auxiliary turn or turns on the setting winding of one of these two cores serves for shifting the setting region of the transfluxor characteristic curve $U_{A1}$, so that the setting range of the other transfluxor is approximately completed upon the start of the setting range of the transfluxor provided with the auxiliary turns. Moreover, the characteristic curve of the transfluxor having the core 1*b* is raised by the action of an auxiliary turn or turns on the output winding provided on the core 1*b*, so that characteristic curve courses appear, for example, as shown in FIG. 4. The two characteristic curves of the individual transfluxors $T_1$ and $T_2$ form the resultant characteristic curve T of the arrangement according to the invention. The setting range $E_1$ of the characteristic curve of the transfluxor $T_1$ begins thereby somewhat above the end of the setting range $E_2$ of the transfluxor $T_2$. The resultant characteristic curve T then exhibits a relative high pitch in the rising as well as in the falling range thereof.

A particularly advantageous embodiment of the invention is obtained by circuiting the transfluxor output windings serially with one another and wound in opposite sense with respect to one another. The setting region of the characteristic curve, for example, $U_{A1}=f_1(I_E)$ of at least one transfluxor, approximately above the end of the setting range of the other transfluxor characteristic curve, for example, $U_{A2}=f_2(I_E)$, is thereby likewise determined. For example, the characteristic curve $U_{A1}$ rises only at the culmination point or slightly before or after the culmination point of the characteristic curve $U_{A2}$. The characteristic curves are thus shifted or displaced. The output voltages are, by the series circuiting of the output windings wound in opposite sense, subtracted with respect to the total voltage, and, assuming appropriate dimensioning of the characteristic curve course, the falling part of the characteristic curve (over-setting region) of the resultant output voltage will likewise be steep, in first approximation with the same steepness as in the setting region.

The invention is realized with two-aperture transfluxors for example, as that shown in FIG. 5, and employing two similar cores having identical blocking-, setting- and driver windings, which cores are magnetized by the same blocking-, setting- and driver currents. Only the output windings are circuited serially with one another and wound in opposite sense with respect to one another, so that the output voltage of the arrangement is composed of the two output voltages of the individual transfluxors. The circuiting of the output windings wound in opposite sense results in the characteristic curve course $U_A=U_{A1}-U_{A2}$. According to the invention, care is taken that the characteristic curves of the individual transfluxors distinguish from one another so that similar characteristic curves appearing with the same core and similar frequency in the output windings, cannot cause cancellation of the output voltages.

This distinction can be effected, for example, by the action of an auxiliary setting winding which permits over one of the two transfluxor cores a shifting or displacement of the setting range of such core, for example, so that the start of this setting range of the corresponding transfluxor coincides approximately with the start of the over-setting range of the other transfluxor.

According to the invention, care is also taken to raise the characteristic curve of the other transfluxor core, for example, with the aid of an auxiliary output winding, thereby obtaining a characteristic curve course such as is for example represented in FIG. 6. The two characteristic curves of the individual transfluxors $T_1$ and $T_2$ provide the resultant characteristic curve T. A characteristic curve course is thus obtained which is relatively very steep in its rising as well as in its falling region.

Circuit arrangements of this kind are used, for example, as analog digital converters. The sharpness of the separation between the individual working ranges will depend upon the steepness of the flanks of the characteristic curve of such an arrangement; the steeper the flanks are, the sharper will be the separation. A satisfactory solution of this problem could not be obtained until now in connection with two-aperture transfluxors, even by improving the ratio of the shortest magnetic path in the magnetic control circuit to the longest magnetic path in the transmission circuit. The solution of the problem was entirely impossible in connection with three-aperture transfluxors since such transfluxors have, in accordance with the operating principle thereof, a rising course of the characteristic curves which does not fall above the optimum setting.

FIGS. 7 and 8 show as an example of the invention, a transfluxor circuit with three-aperture transfluxors, FIG. 7 representing the circuit arrangement and FIG. 8 indicating the course of the characteristic curve thereof. The advantage of this circuit arrangement resides, for example, in that an auxiliary setting winding for the shifting of the setting region need be provided only upon one core. An auxiliary driver winding or different numbers of turns in connection with the output windings can be dispensed with. By the shifting or displacement of the characteristic curve region is obtained, from the two transfluxor characteristic curves $T_1$ and $T_2$, the resultant characteristic curve T.

FIG. 9 shows in schematic manner an example of a transfluxor circuit according to the invention, employing two three-aperture transfluxors and simplified windings. There are provided two similar transfluxors 1*a* and 1*b* which are separated by a spacer ring 8. One of these transfluxors 1$b$ has an auxiliary setting winding 10 which is serially connected with the main setting winding 9, the latter being placed over both flux legs of the two transfluxors 1$a$ and 1$b$, so that the setting current must flow through the main setting winding 9 and through the auxiliary setting winding 10. This results in a setting flow which is different in the two transfluxor cores. The setting winding 10 may be considered as auxiliary turns of the winding 9. Moreover, a common driver winding 13, a common blocking winding 11 and the output windings 12$a$ and 12$b$, are placed over both transfluxor cores. The two last noted windings are circuited in opposite sense of winding direction.

This example of the circuit arrangement according to the invention, employing three-aperture transfluxors, presents the economic advantage of permitting a technically optimum arrangement of the circuit, using similar transfluxor cores with similar windings for the blocking, the driving and for the output voltages. The width of the opening range of the entire circuit is determined by the shifting of the individual characteristic curves.

For example, a characteristic curve may be advantageous, having a culmination point which is spread over a broader range, that is, having a path in the maximum thereof which extends approximately in a plane and thereupon falling as steeply as possible.

The circuit arrangement according to the invention, with output windings connected serially and wound in opposite sense with respect to one another, is moreover advantageous since interference voltages of the individual transfluxors are compensated without requiring dimensioning of the number of winding turns in accordance with such interference voltages. In the event that no importance is attached to similar numbers of turns of the setting windings of both cores, the shifting of the characteristic curves may be obtained by connecting variable resistors in parallel with the setting windings so as to vary the setting current.

FIG. 10 shows a circuit arrangement according to the invention, comprising two two-aperture transfluxors. The transfluxor cores 1$a$ and 1$b$ are mutually separated by a spacer disk 8. The cores 1$a$ and 1$b$ have a common setting winding 9 and the core 1$a$ has additionally further setting winding 10. The winding 10 may be considered as additional turns of the winding 9. The setting current $I_E$ thereby causes in the transfluxor core 1$a$ a stronger setting flow $I_E.w_{E1a}$ than in the transfluxor core 1$b$ ($I_E \cdot w_{E1b}$). Moreover, both transfluxors are provided with a common blocking winding 11 which is traversed by the blocking current $I_B$. The core 1$a$ is provided with an output winding 12$a$ and the core 1$b$ is provided with an output winding 12$b$ having a greater number of turns than the winding 12$a$ ($w_{a12b}>w_{a12a}$). Both windings are serially connected and wound in the same sense with respect to one another, so that the resultant output voltage can be obtained at the terminals $U_{A\alpha}$ and $U_{A\beta}$. Numeral 13 indicates the common driver winding which is traversed by driver current $I_t$. The shifting of the characteristic curve course can be set as desired by the number of turns of the auxiliary setting winding 10.

FIG. 11 shows another form of the circuit arrangement according to the invention, wherein the auxiliary setting winding 10 for one of the cores 1$a$ or 1$b$ is omitted, there being instead provided, for the two cores, separate setting windings 9$a$ and 9$b$ which have the same number of turns ($w_{E1B}=w_{E1a}$). With parallel connection of these setting windings the shifting of the characteristic curve is obtained by a resistor 14 which is operative to split the setting current $I_E$ into different setting currents $I_{E1}$ and $I_{E2}$.

In the case of operation with a load, for example, for the control of transistors, the characteristic output current curve according to the invention can likewise be determined by appropriate superposition analogous to the determination of the characteristic output voltage curve. The output windings are in such case electrically connected in parallel over resistors. The output currents of the individual transfluxors may thereby have different values. Upon connection of a load, the characteristic curves of the output currents $I_A$ according to the invention can be connected to the output terminals of the entire arrangement. Examples for such circuitry are shown in FIGS. 12 and 13, in which the setting-, blocking- and driver windings have been omitted for the sake of clarity.

In FIG. 12, the output windings are connected in parallel and wound in opposite sense with respect to one another. Each output winding is loaded with one of a pair of resistors $R_1$ and $R_2$ respectively ahead of the branching point 15. The resistors serve for the shifting of the characteristic output current curves $I_{A1}$ and $I_{A2}$. The superposed characteristic curve $I_A$ resulting from the two curves $I_{A1}$ and $I_{A2}$, respectively, meets the requirements of the invention, for example, for the control of transistors.

In FIG. 13, the output windings are connected in parallel and wound in the same sense with respect to one another.

There are thus, in accordance with the invention, different possibilities for shifting the characteristic curve. On the one hand, a core may be provided with a setting winding having a greater number of turns, so as to obtain with identical setting current a different excitation. It is on the other hand in accordance with a further feature of the invention possible to use different transfluxor cores, for example, different core shapes or different core material. Both cores can thereby be provided with identical setting windings. It is also possible to provide an arrangement in which the setting windings of the transfluxors are traversed by different setting currents.

As has been said before, the circuit arrangement according to the invention can be used, for example, as an analog digital converter. It is in such case desirable to provide for a sharp separation between the individual working ranges, which can be well obtained with steep courses of the characteristic curves and as sharp a transition as possible. The circuit arrangement according to the invention is likewise adapted for impulse operation and for other regulation purposes.

For example, the circuit arrangement can be used as an integral regulator. As is known, the regulator value in connection with an integral regulator, must be varied until it attains a given desired value. The regulator compares the regulation value with the desired value and forms a set value which is proportional to the time integral over the difference of regulation value and desired value, such set value controlling the regulation value. The regulation operation is concluded when the time integral remains constant, that is, when the difference between desired value and regulation value has become zero, the set value thereby assuming a given value. The setting element is purely electrically operative in such integral transfluxor regulators according to the invention.

It is furthermore possible in accordance with the invention to construct a transfluxor arrangement with more than two transfluxors. Different functions may thereby be assigned to the different transfluxors, depending upon the connection of the output windings and the windings provided thereon, for example, narrowing of the opening range and/or steepening of the flanks of the characteristic opening curve, and/or compensation of interference voltages, and/or increase of the operatively useful voltage of the entire circuit. The output windings of two or more of the transfluxors can thereby be serially connected in the same winding sense and the remaining transfluxor windings can be serially connected with opposite winding sense.

The principle underlying the invention can also be utilized in connection with plural-aperture transfluxors. Such transfluxors have a plurality of setting apertures and/or a plurality of transmission apertures or circuits, respectively. One or more transmission circuits can then be controlled by one or more setting currents, so that the transfluxors can, for example, be opened only when a plurality of setting currents reach the critical values simultaneously or successively in regulated or in unregulated sequence. It is likewise possible to control different outputs of plural-aperture transfluxors, to produce different characteristic curves for the different paths of the flow of information, and to connect the various output windings in appropriate manner as desired.

A particularly economical production of the entire arrangement can be obtained upon using identical transfluxor types and/or forming individual windings similarly and/or with identical number of turns, since it is in such cases possible to provide the windings on the transfluxor cores simultaneously and in common, thereby effecting savings as compared with the time required for separately winding each individual transfluxor. Only the auxiliary setting windings or auxiliary output windings, required depending upon the shifting of the characteristic curve, would then have to be provided upon one or more transfluxors prior to placing the common windings thereon.

Changes may be made within the scope and spirit of the appended claims which define what is believed to be new and desired to have protected by Letters Patent.

We claim:

1. A transfluxor circuit arrangement comprising at least two transfluxors, an output winding for each transfluxor, wherein the characteristic curves of the respective output values are shifted so that the setting region of one transfluxor starts above the end of the setting region of at least one other transfluxor, and means for electrically connecting the output windings so as to effect superposition of the respective output values.

2. A circuit arrangement according to claim 1, comprising identical transfluxor cores, a set winding disposed on a first and second core, the set winding on said first core having a greater number of turns than the set winding on said second core for effecting the shifting of the setting range, and means for causing the same setting current to flow through all setting windings.

3. A circuit arrangement according to claim 1, comprising identical transfluxor cores which are provided with identical setting windings, and means for causing different setting currents to flow through the different setting windings so as to effect the shifting of the setting range.

4. A circuit arrangement according to claim 1, comprising identical set winding on different transfluxor cores for the shifting of the setting range.

5. A circuit arrangement according to claim 4, comprising cores constructed with different dimensions.

6. A circuit arrangement according to claim 4, comprising cores made of different materials.

7. A circuit arrangement according to claim 4, comprising cores made of different materials and constructed with different dimensions.

8. A circuit arrangement according to claim 1, comprising means for serially connecting the output windings with opposed sense of winding direction.

9. A circuit arrangement according to claim 1, comprising means for serially connecting the output windings with identical sense of winding direction.

10. A circuit arrangement according to claim 1, comprising means for connecting the output windings in parallel relationship in identical sense of winding direction, each winding in series with a resistor.

11. A circuit arrangement according to claim 1, comprising means for connecting the output windings in parallel relationship in opposing sense of winding direction, each winding in series with a resistor.

12. A circuit arrangement according to claim 1, comprising more than two transfluxors, and circuit means for differently interconnecting said output windings.

13. A circuit arrangement according to claim 1, comprising two two-aperture transfluxors.

14. A circuit arrangement according to claim 13, wherein said transfluxors have identical cores, a spacer member for separating said cores, common windings for said cores, one of said common windings forming a set winding on a first and a second core, the set winding on said first core having a greater number of turns than the set winding on said second core, another of said common windings forming a driver winding on said first core and said second core, the driver winding of one of said cores having a greater number of turns than the driver winding on the other of said cores.

15. A circuit arrangement according to claim 1, comprising at least two transfluxor cores, a first output winding on a first core and a second output winding on a second core, the turns of said first output winding differ with respect to the turns of said second output winding.

16. A circuit arrangement according to claim 1, comprising at least two transfluxor cores, a first driver winding on a first core and a second driver winding on a second core, the turns of said first driver winding differ with respect to the turns of said second driver winding.

17. A circuit arrangement according to claim 1, comprising plural-aperture transfluxors having respectively a plurality of magnetic control circuits.

18. A circuit arrangement according to claim 17, comprising plural-aperture transfluxors having respectively a plurality of magnetic transmission circuits.

19. A circuit arrangement according to claim 1, comprising plural-aperture transfluxors having respectively a plurality of magnetic transmission circuits.

20. A circuit arrangement according to claim 1, comprising two 3-aperture transfluxors.

21. A circuit arrangement according to claim 20, wherein said transfluxors have identical cores, comprising a spacer member for separating said cores, a common blocking winding for said cores, a common driver winding for said cores, a common output winding for said cores, a common set winding on said cores, the set winding having a greater number of turns on one of said cores than that on the other of said cores.

22. A circuit arrangement according to claim 13, wherein said transfluxors have identical cores, a spacer member for separating said cores, a common blocking winding on said cores, a common output winding on said cores, a common set winding on said cores, a common driver winding on said cores, the set winding having a greater number of turns on a first of said cores than the number of turns on a second of said cores, the driver winding having a greater number of turns on one of said cores than the number of turns on the other of said cores.

23. A circuit arrangement according to claim 13, wherein said transfluxors have identical cores, a spacer member for separating said cores, a common blocking winding on said cores, a common driver winding on said cores, a common set winding on said cores, a common output winding on said cores, the set winding having a greater number of turns on a first of said cores than the number of turns on a second of said cores, the output winding having a greater number of turns on one of said cores than the number of turns on the other of said cores.

24. A circuit arrangement according to claim 13, wherein said transfluxors have identical cores, a spacer member for separating said cores, common windings for said cores, one of said common windings forming a set winding on a first and a second core, the set winding on said first core having a greater number of turns than the set winding on said second core, another of said common windings forming an output winding on said first core and said second core, the output winding on one of said cores having a greater number of turns than the output winding on the other of said cores.

25. A circuit arrangement according to claim 1, comprising identical transfluxor cores, a set winding disposed on a first and second core, the set winding on said first core having a greater number of turns than the set winding on said second core.

26. A circuit arrangement according to claim 20, wherein said transfluxors have identical cores, comprising a spacer member for separating said cores, and common windings for said cores, one of said common windings forming a set winding on a first and a second core, the set winding having a greater number of turns on one of said cores than the number of turns on the other of said cores for shifting the range of the characteristic curve.

No references cited.

BERNARD KONICK, *Primary Examiner.*

J. W. MOFFITT, *Assistant Examiner.*